United States Patent [19]

Hart

[11] 4,285,377

[45] Aug. 25, 1981

[54] SAFETY BOLT

[75] Inventor: Dale H. Hart, Seal Beach, Calif.

[73] Assignee: Hi-Shear Corporation, Torrance, Calif.

[21] Appl. No.: 881,141

[22] Filed: Feb. 28, 1978

Related U.S. Application Data

[63] Continuation-in-part of Ser. No. 781,851, Mar. 28, 1977, abandoned, which is a continuation-in-part of Ser. No. 757,574, Jan. 7, 1977, abandoned.

[51] Int. Cl.² ............................................. F16B 39/04
[52] U.S. Cl. .................................... 411/190; 411/106; 411/318; 411/347; 411/437
[58] Field of Search ............... 151/6, 5, 9, 69, 62, 151/63, 24; 85/5 B, 5 E, 5 M, 5 CP; 24/211 R; 292/327

[56] References Cited

U.S. PATENT DOCUMENTS

| 960,999 | 6/1910 | Nicholson | 151/5 |
|---|---|---|---|
| 1,433,410 | 10/1922 | Passauer | 151/6 |
| 1,597,667 | 8/1926 | Blair | 151/9 |
| 2,327,148 | 8/1943 | Yates | 85/5 M |
| 2,906,311 | 9/1959 | Boyd | 151/9 |
| 3,046,827 | 7/1962 | Myers | 85/5 B |
| 3,145,441 | 8/1964 | Strandrud | 85/5 B |
| 3,361,176 | 1/1968 | Jansen | 151/6 X |
| 3,386,137 | 6/1968 | McCarthy | 24/211 R |
| 3,390,712 | 7/1968 | McKay | 151/69 X |
| 3,474,506 | 10/1969 | Metz | 24/211 R |
| 3,535,750 | 10/1970 | Metz | 24/211 R |
| 3,561,516 | 2/1971 | Reddy | 151/9 |
| 3,712,356 | 1/1973 | Petroshanoff | 151/6 |

FOREIGN PATENT DOCUMENTS 448650 8/1927 Fed. Rep. of Germany .............. 151/6

Primary Examiner—Ramon S. Britts
Attorney, Agent, or Firm—Donald D. Mon

[57] ABSTRACT

A safety bolt having a headed end, a shank, and a second end with means near the second end to hold the bolt in a hole in a workpiece. An axial passage opening into the second end intersects a laterally-extending passage spaced therefrom, and a dog fits in the laterally-extending passage wherein it is laterally reciprocable so as to be extendible beyond the maximum diameter of the shank or to be entirely retracted within it. A cam member having a pair of oppositely facing cam surfaces is axially slidable in the axial passage. The dog has a pair of followers one on each side bearing against oppositely directed cam surfaces whereby the lateral position of the cam is uniquely a function of the axial position of the cam member. Bias means is provided to bias the cam member to a position corresponding to maximum extension of the dog.

14 Claims, 18 Drawing Figures

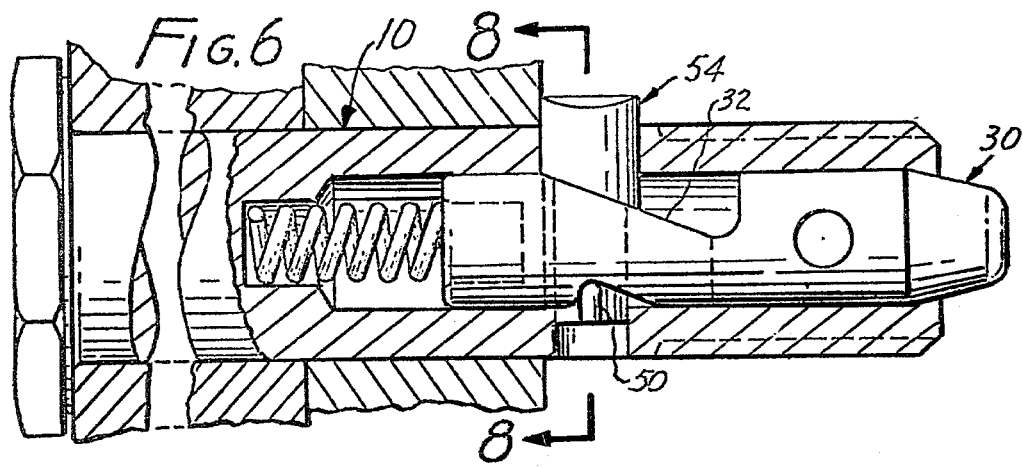
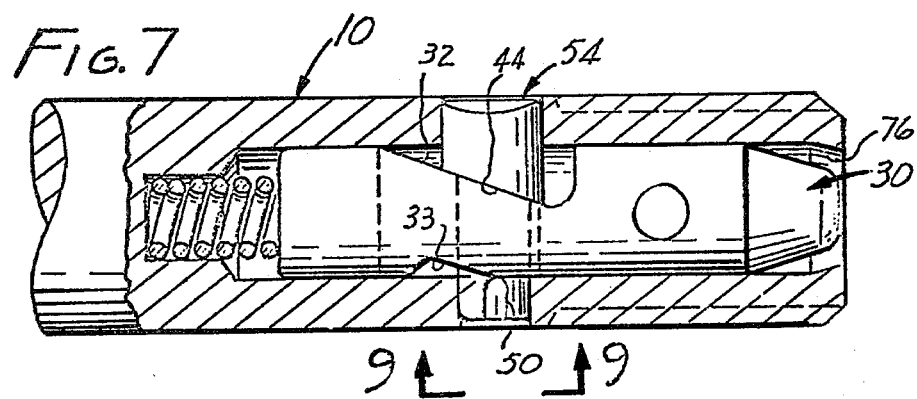
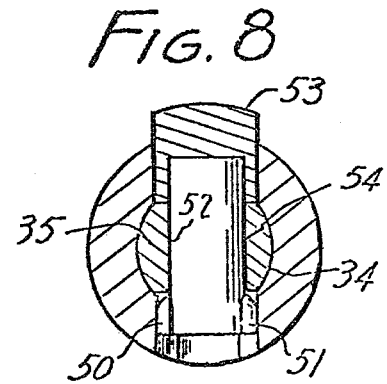 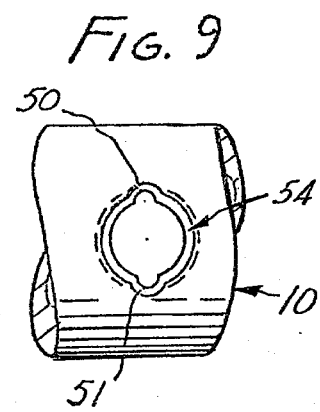
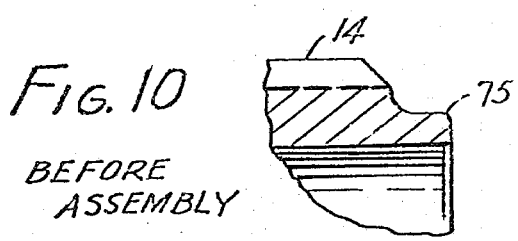

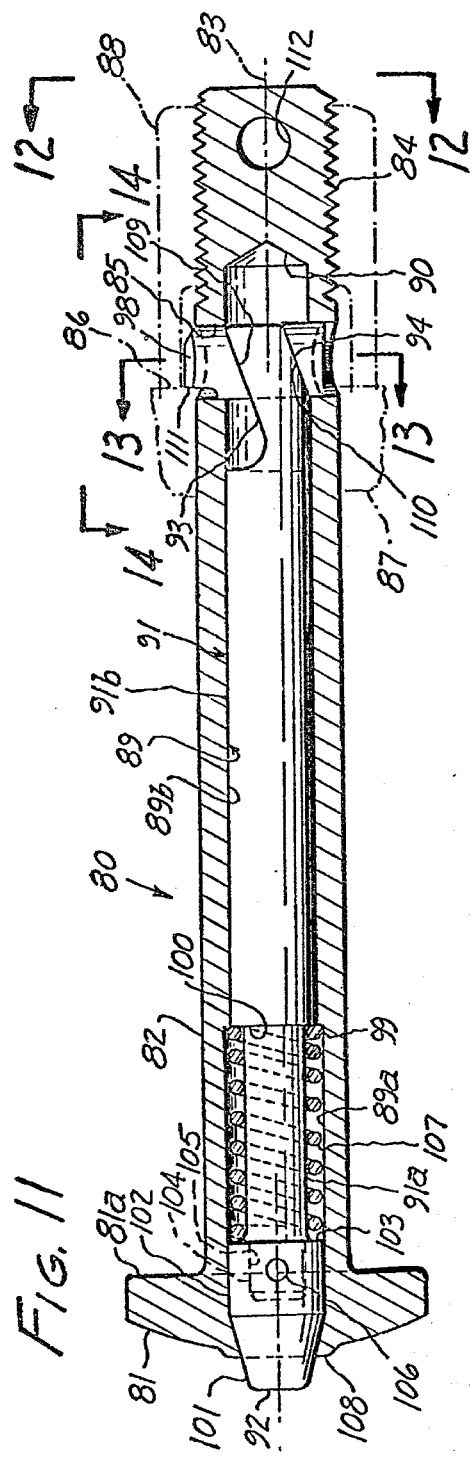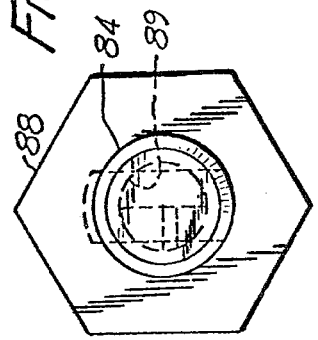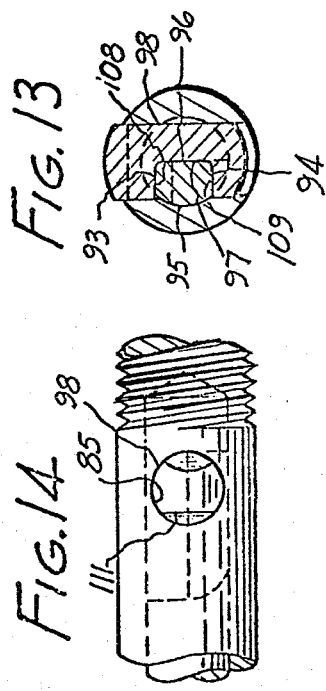

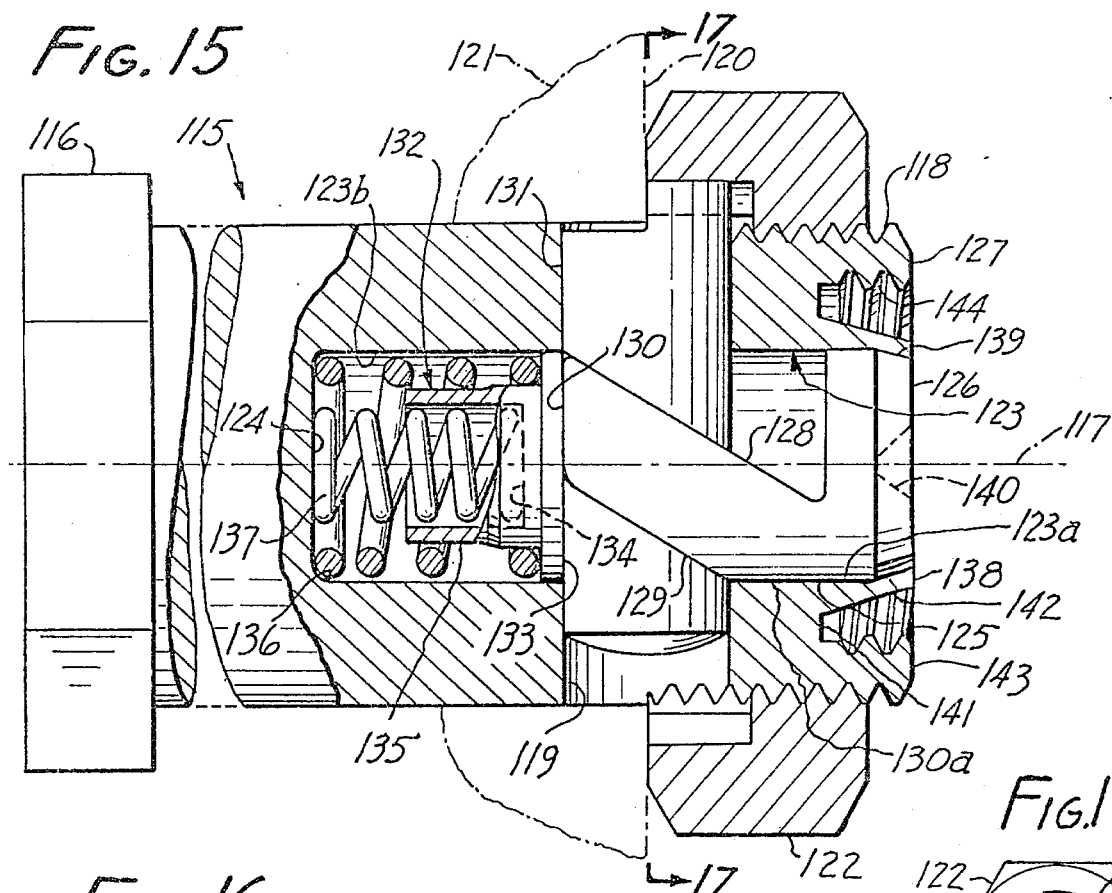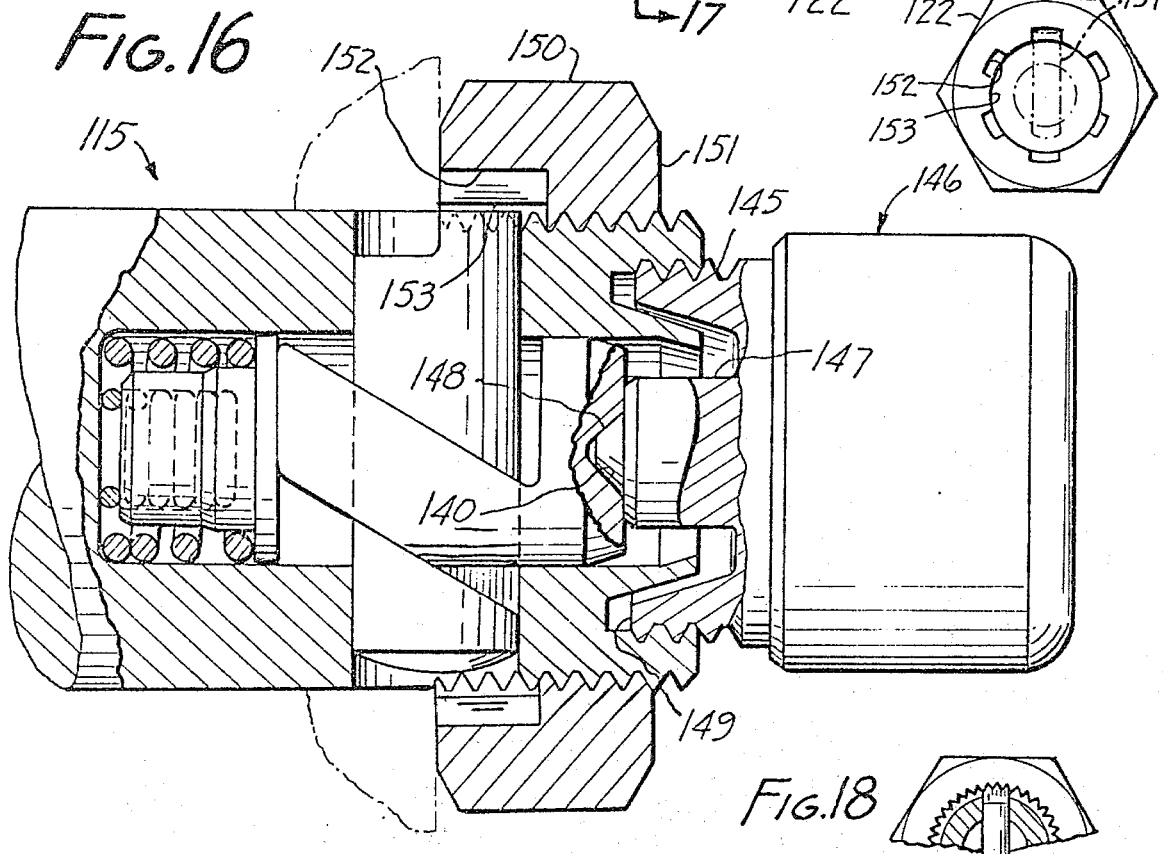

SAFETY BOLT

This is a continuation-in-part of application Ser. No. 781,851, filed Mar. 28, 1977, now abandoned, which is a continuation in part of application Ser. No. 757,574, filed Jan. 7, 1977, now abandoned.

This invention relates to safety bolts.

Especially in aircraft and other heavy type installations, the principal utility of a bolt is to withstand shear loads exerted laterally relative to its axis. In practice, a nut is threaded onto the bolt to hold the bolt in the hole, and also to tighten the joint so it is resistant to fatigue forces and to axial separative loads. However, the axial loads are ordinarily of considerably lesser magnitude than the shear loads and are not the primary intended functions of the bolt.

When a nut shakes loose, or the machine neglects to put the nut on, a situation of very great danger arises, because the bolt could simply fall out of the hole, leaving disabled some critical element of the installation such as a landing gear or some other pivotally mounted device. To overcome this risk, there has been devised a class of bolt known as the "safety bolt" which includes within itself inherent means for axial retention, which while not as strong as a nut threaded onto the bolt, still will hold the bolt in its hole under critical situations, and enable the bolt to perform its primary intended function. If the nut is forgotten or shaken off, the bolt will remain in place under many or most important conditions. Among the prior art efforts to supply a safety bolt are the following:

| U.S. Pat. Nos.: | | | |
|---|---|---|---|
| Nicholson | 960,999 | Myers | 3,046,827 |
| Passauer | 1,433,410 | McKay | 3,390,712 |
| Blair | 1,597,667 | Reddy | 3,561,516 |
| Boyd | 2,906,311 | | |
| Germany patent No. 448,650 (1927) | | | |

A common disadvantage of the prior art is the provision of dogs whose position is possibly arbitrarily relative to the position of its actuator. This is because the actuators can become decoupled from the dog or other latching means, with the exception of the Passauer patent which requires pivotal connections and excessively large passages through the sides of the bolt which weaken the strength of the bolt.

Accordingly it is an object of this invention to provide a safety bolt having a laterally movable dog whose position is uniquely associated with that of its actuator (a cam member herein). Therefore, when the actuator is in a position indicative of locking or of unlocking one can be certain that the dog also is in such a position.

According to one aspect of the invention, the actuator is actuated from the front, that is, the head end of the bolt. According to another aspect of the invention, the actuator is actuated from the rear end of the bolt.

A feature of another embodiment of the invention resides in the use of a double spring arrangement for biasing the actuator. By making the springs of different spring rates, there is prevented the setting up of harmonic vibration which, if present, might relieve the biassing pressure of the spring thereby permitting undesired unlocking of the fastener.

Still another feature included in one embodiment resides in the provision of means for holding the dog in its unlocked position until the fastener is inserted through the hole.

Still another optional feature resides in the provision of means enabling the dog to lock a nut in addition to locking against or behind a workpiece.

The above and other features of this invention will be fully understood from the following detailed description and the accompanying drawings in which:

FIG. 6 is a side elevation partly in cutaway cross-section, showing the presently preferred embodiment of the invention;

FIG. 7 shows the embodiment of FIG. 6 in another operating position;

FIG. 8 is a cross-section taken at line 8—8 of FIG. 6;

FIG. 9 is a view taken at line 9—9 in FIG. 7;

FIG. 10 is a detail view of an intermediate step in the assembly of the device of FIG. 1;

FIG. 11 is an axial cross-section view of another embodiment of the invention showing a nut torqued against a workpiece;

FIG. 12 is an end view looking from line 12—12 of FIG. 11;

FIG. 13 is a cross-section view taken at line 13—13 of FIG. 11;

FIG. 14 is a view showing a detail looking from line 14—14 of FIG. 11;

FIG. 15 is an axial cross-section view of another embodiment of the invention showing a fastener in a locked position relative to a nut;

FIG. 16 is an axial cross-section view of the fastener of FIG. 15 in its unlocked position;

FIG. 17 is a view looking at the locked nut from line 17—17 of FIG. 15; and

FIG. 18 is a fragment of another modification.

Figure 1:
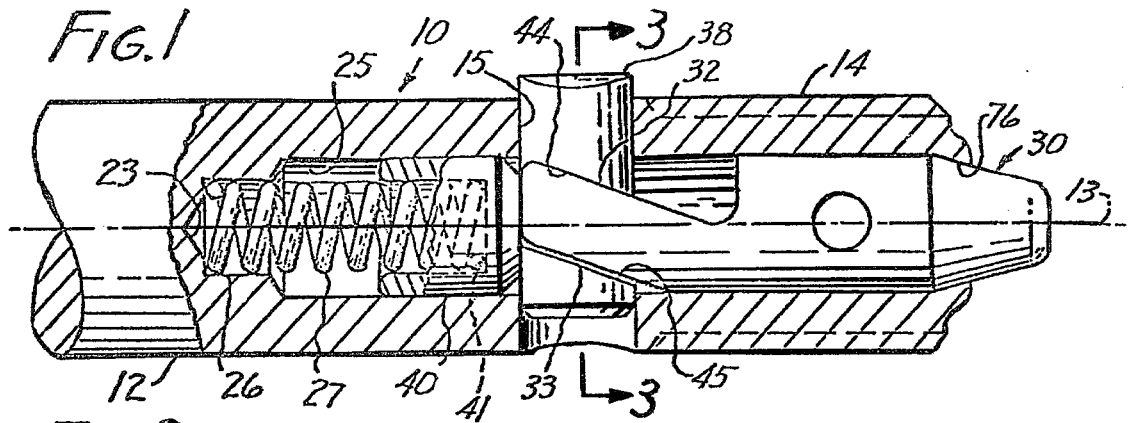
FIGS. 1 and 2 are axial sections of the presently preferred embodiment of the invention.

In FIGS. 1-4 there is shown a safety bolt 10 according to the invention having a head 11, a shank 12, an axis 13 and a threaded section 14. A laterally-extending passage 15 extends laterally (transversely) across the shank at a location intended to be at or near the anticipated rear surface 16 of a workpiece 17. The workpiece is shown as comprising a pair of bodies 18, 19 which might for example be plates having aligned holes 20, 21 therethrough. These holes are sometimes referred to in the singular as a "hole through the workpiece". The shank is intended to fit snugly in the hole, and to be retained therein by the safety feature of the safety bolt and also by a nut 22 threaded to the threaded section. The nut may conveniently have a counterbore 23 to clear the safety feature of this invention.

An axial passage 25 extends into the bolt from the threaded end where at its bottom it forms a seat 26 for bias means 27. The bias means conveniently comprises a coil compression spring seated in the seat.

Figure 5:
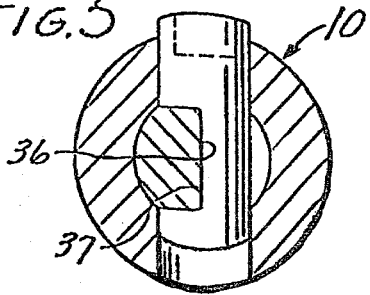
FIG. 5 is a cross-section similar to FIG. 3 showing a modification of the device.

A cam member 30 fits in the axial passage and is slidable axially therein. It has a nose 31 which can project beyond the threaded end of the shank when the safety belt is in its safetied extended position. The cam member carries a first cam surface 32 and a second cam surface 33 which face laterally oppositely from one another. They are preferably parallel to one another. They may conveniently be formed on a pair of tongues 34, 35 (FIG. 3), with two cam surfaces on each of the tongues. Alternatively as shown in FIG. 5 only one "tongue" need be provided instead of two. In both embodiments, an optional bearing surface 36 is provided on the tongue to bear against an optional bearing surface 37 on a dog 38. The dog fits slidably in the laterally-extending passage.

A contactor 40 is provided with a seat 41 for the other end of the bias means. It bears against an end of the tongue. Alternatively, the contactor can be formed unitarily with the remainder of the cam member and is spoken of herein as a part thereof. A cross hole 42 is formed in the cam member and also in the threaded portion of the safety bolt to receive a cotter pin in the safetied position.

The dog includes follower surfaces 44, 45 (sometimes called "followers") which respectively bear against cam surfaces 32 or 33 when the cam member is shifted axially so as to move the dog laterally.

The embodiment of FIG. 6 is substantially identical to the embodiment of FIG. 1 and identical numbers are used for identical parts. The principal difference between them comprises the integration of the cam member and the contactor as previously discussed, and a variation in the shape of the cam followers. In this case cam followers 50, 51 comprise tangs which bear against cam surface 33. When the device is put together, dog 54 is passed upward through a hole 52 in the cam member and then a cap 53 is attached to it to form part of the dog. The cap can have an elliptical (non-circular) shape, as can the laterally-extending passage in which it fits. This holds the dog against rotation.

Figure 2:
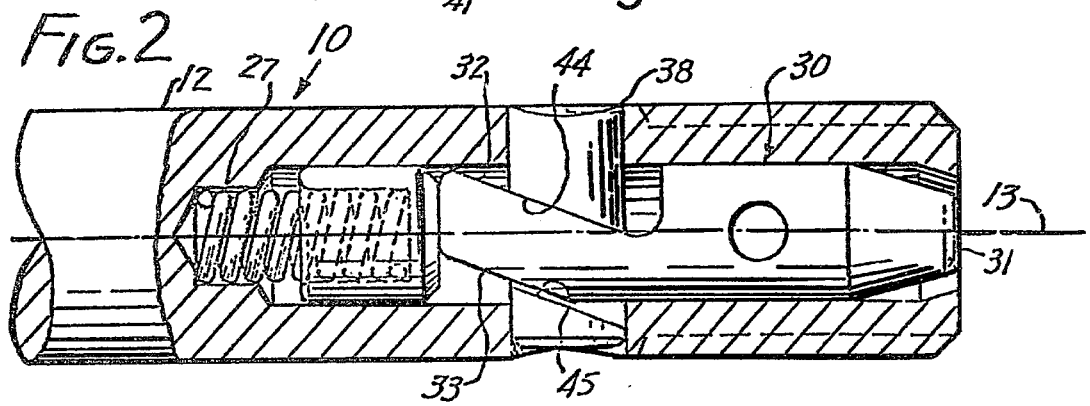
Figure 4:
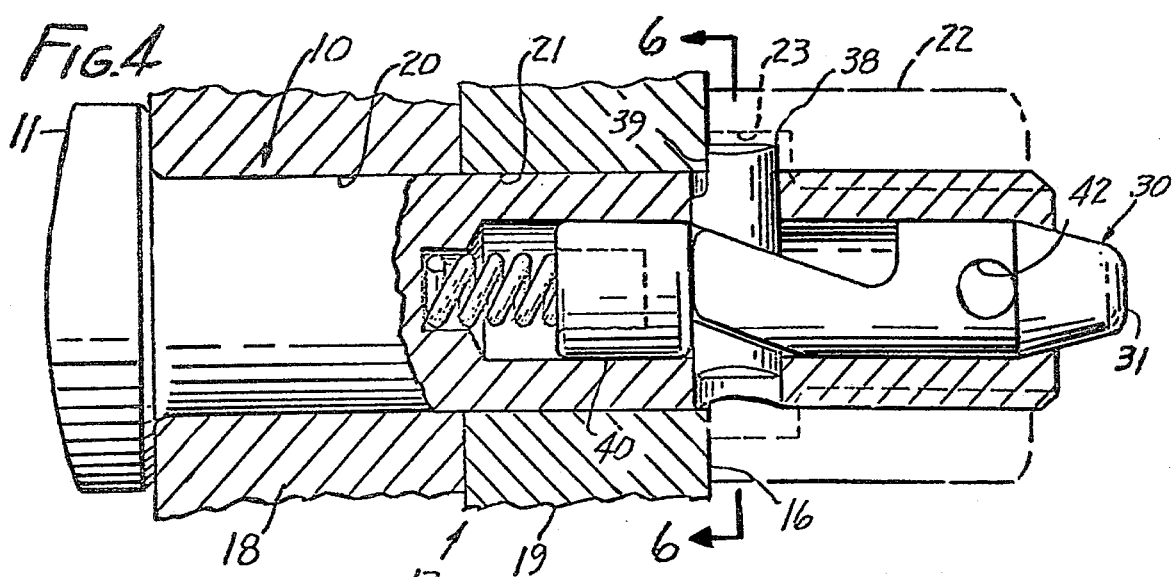
FIG. 4 shows the device of FIG. 1 fully installed in a workpiece.
Figure 3:
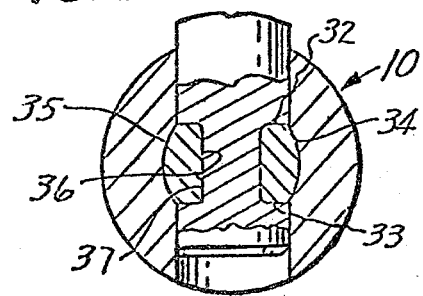
FIG. 3 is a cross-section taken at line 3—3 of FIG. 1.

The operation of the safety bolt should be evident from the foregoing. In the device of FIG. 1 the safety bolt is inserted into the hole. The cam member can be depressed as shown in FIG. 2 until the dog is in the hole, where the dog will be retracted until it has passed the rear surface of the workpiece. Then it will snap out to the conditions shown in FIGS. 1 and 4. The dog cannot be retracted except by applying an axial end load at the nose end of the cam member. It locks unless the cam member is "released" in this manner. When a flat abutment surface 39 is used as in FIG. 4, it will bear against the back surface. It it is not used, then the rounded surface of the dog will make a line or even a point contact. A nut can be threaded onto the threaded section if desired. Also a cotter pin may be passed through the cotter pin holes, including a cotter pin hole through the nut when a nut is used. To remove the safety bolt it is merely necessary to remove the nut and cotter pin and then to press the end of the cam member, which will cause cam surface 32 to bear against follower 45 which will retract the dog into the hole.

In FIG. 6 the lower cam surface 33 bears against the follower 50 for the same purpose. FIG. 10 shows a lip 75 at the end of the threaded section which can be staked over to form a shoulder 76 after the cam member is inserted, so as to retain it in the passage. This shoulder can make a seal with the cam member to exclude matter from the passage.

It will be noted that the dog and the cam member are in push-pull relationship so that there is no possibility that the cam member can move axially, still leaving the dog hung up inside the lateral passage. It can be visually ascertained from an examination of the cam member itself that the safety bolt is actually locked in place even though the dog may be covered by the nut so that it cannot be seen.

The embodiment of the invention shown in FIGS. 11 through 14 utilizes a basic principle similar to that of the embodiments shown in FIGS. 1 through 10, but differs in that the embodiment of FIGS. 11 through 14 is actuated from the head end of the bolt instead of from the threaded end of the bolt as in FIGS. 1 through 10. Referring to FIGS. 11 through 14, there is shown a safety bolt 80 having a head 81, and a shank 82 on a longitudinal axis 83 with a threaded section 84 at the end of the shank opposite the head. A laterally extending passage 85, corresponding with passage 15 of FIG. 1, extends transversely across the shank at or near the rear surface 86 of a workpiece 87 partially shown in phantom. It is understood that the workpiece will generally comprise bodies to be fastened together in the manner of bodies 18 and 19 shown in FIG. 4 such that the forward surface of the workpiece bodies abuts against the rear surface 81a of head 81. The shank fits through a "hole through the workpiece" as explained in the description of FIGS. 1 through 4, and the nut 88, shown in FIG. 12 and in phantom in FIG. 11, is threaded to the threaded section 84 and torqued against the rear surface 86 of the workpiece.

An axial passage 89 extends into the bolt from the head end and terminates at a position 90 a short distance forward of the rear end of the threaded shank section. A cam member 91 is axially slidable within the passage 89 and has a forwardly facing nose 92 which normally projects forwardly beyond the bolt head 81. The cam member has two oppositely facing, parallel, cam surfaces 93 and 94, formed on a tongue 95, corresponding to cam surfaces 32 and 33 of FIG. 1. A bearing surface 96 on the tongue bears against a mating bearing surface 97 on a dog 98 which is slidably fitted within the lateral passage 85. The passage 89 through the bolt is enlarged at a forward region 89a relative to the rearward portion 89b and this rearward portion 89b makes a sliding fit with the cylindrical surface of portion 91b of cam member 91, thereby forming a rearwardly facing shoulder 99. Also within the region 89a of the bolt shank the cam member 91 reduces in diameter at 91a relative to its diameter 91b thereby forming a shoulder 100 facing forwardly. Shoulders 99 and 100 are co-planar when the device is in its safety position shown in FIG. 11. The nose portion 92 of the cam member expands rearwardly along a conical surface 101 to a cylindrical section 102 whose exterior diameter is such that it makes a sliding fit within section 89a of the bolt shank. The rear of section 102 of the nose thus forms a rearwardly facing shoulder 103 where it meets section 91a of the cam member. The forward end of section 91a has a forwardly-extending protrusion 104 which fits snugly within a bore 105 extending from the rear shoulder 103 forwardly for some distance. The protrusion 104 is secured to the nose portion 102 by means of a pin 106 tightly fitted into aligned lateral holes through the protrusion 104 and the wall of the nose section 105 at both sides of protrusion 104.

A helical compression spring 107 compressed at one end against shoulders 99 and 100 and at the other end against shoulder 103 provides a bias urging the cam member to remain in its safety position shown in FIG. 11. The cam member cannot slide further forward than the position illustrated in FIG. 11 for the reason that the forward lip 108 of the bolt head, which, prior to assembly of the parts had an internal diameter the same as the diameter at area 89a, has been staked over after assembly to a smaller diameter surrounding the conical nose portion 101, thereby preventing further forward movement of the cam member. The cam member, however, can be slid rearwardly from the position shown in FIG. 11 by pushing rearwardly on the nose 92, which will have the effect of compressing the biasing spring 107 to a smaller axial length by reason of the fact that shoulder 99 prevents the rear end of the spring from moving rearwardly from the position shown in FIG. 11, even though the shoulder 100 of the cam member does move rearwardly.

The dog has follower surfaces 109 and 110 which bear respectively against cam surfaces 93 and 94 so that when the cam member is moved axially within the axial passage of the bolt it moves the dog laterally. In the normal safety position shown in FIG. 11, one end of the dog protrudes outwardly beyond the exterior diameter of the bolt shank. Also the position of the lateral passage 85, and hence of the dog, is such that the forward facing surface 111 of the dog is at the rear face 86 of the work piece. A hole 112 through the threaded end of the shank and a corresponding hole through the nut permits the insertion of a cotter pin to maintain the nut against the workpiece.

The operation of this head-end actuated safety bolt is apparent from the foregoing discussion of the operation of the thread-end actuated safety bolt of FIG. 1. Cam member 91 is moved rearwardly by depressing the nose 92 to move the dog within the outside diameter of the bolt shank 82 until the dog is within the hole of the workpiece. Then the bolt will be pushed rearwardly through the workpiece until the dog snaps out laterally behind the workpiece to its safety position shown in FIG. 11. The effect of the biasing spring will cause the rear face 111 of the dog to be brought into contact with the rear face of the workpiece. The face 111 of the dog cannot be removed from behind the rear face of the workpiece until the nose 92 of the actuator or cam member is depressed. The nut 88 can then be threaded to the threaded end of the bolt and secured by a cotter pin passed through hole 112 at the threaded end and aligned holes of the nut. Use of the nut is optional.

The device of FIGS. 11 through 14 may be found preferable to that of FIGS. 1 through 10 in situations where lack of clearance at the thread-end of the bolt does not permit ready actuation of a rear-end actuator, with attendant difficulty of applying a rear-end nut.

The embodiment of the invention shown in FIGS. 15 to 17 differs from those shown in FIGS. 1 through 10 in that the means for biasing the cam member comprises a double spring arrangement and also in the provision of means for holding the locking pin in a retracted position for insertion through the "hole through the workpiece". There is shown in these FIGS. 15 and 16 a safety bolt 115 having a head 116 on a longitudinal axis 117 with a threaded section 118 at the end of the shank opposite the head. A laterally extending passage 119, corresponding with passage 15 of FIG. 1 extends transversely across the shank at or near the rear surface 120 of a workpiece 121 partially shown in phantom. As in previous embodiments the workpiece will generally comprise bodies to be fastened together in the manner of bodies 18 and 19 shown in FIG. 4 such that the forward surface of the workpiece body abuts against the rear surface of head 116. As in previous embodiments, the shank fits through the "hole through the workpiece" as explained in the description of FIGS. 1 through 4, and a nut 122 is threaded to the threaded section 118 and torqued against the rear surface of the workpiece.

An axial passage 123 extends into the bolt from the threaded end and terminates at a position 124 which is at some distance rearward of the head end of the shank. A cam member 125 is axially slidable within the passage 123 and has a rearwardly facing end 126 which is normally co-planar with the rear end 127 of the bolt.

The cam member has two oppositely facing, parallel cam surfaces 128 and 129 formed on a tongue 130, this tongue and its cammed surfaces being constructed like the tongue 35 and cam surfaces 93 and 94 shown in FIGS. 11 and 13. The tongue 130 has a bearing surface (not shown in FIGS. 15 and 16) which is like the bearing surface 96 in FIG. 13, which bears against a mating bearing surface (not shown in FIGS. 15 and 16) which is like the bearing surface 97 in FIG. 13 on a dog 131.

The dog 131 is constructed like the dog 98 of FIGS. 11, 13 and 14. This dog is slidable within the lateral passage 119 which is constructed like the lateral passage 85 of FIG. 14. The rear part 123a of axial passage 123 makes a sliding fit with the cylindrical surface of rear portion 130a of cam member 130.

Within the forward section 123b of axial passage 123, forward of the cam member and dog, there is provided a contactor 132 which corresponds generally with the contactor 40 of FIGS. 1 through 4, but which differs in some respects as follows. The contactor 132 comprises a base member 133 in the form of a circular disc having an outer diameter which makes a sliding fit with the cylindrical wall of the passageway portion 123b. At the rear surface of the base member 133 there is attached a cup-like member comprising a base 134 from which a cylindrical portion 135 extends forwardly for some distance. The outer diameter of the cylindrical portion 35 is less than that of base member 133 so that a helical compression spring 136 is accommodated between the wall of passageway 123b and the outer wall 135 of the cup member. This helical spring is adapted to be compressed between the base member 133 and the forward end 124 of passageway 123.

There is also included another helical spring 137 the rear part of which is received within the cup portion 132 and is adapted to be compressed between cup base 134 and the end 124 of the passageway 123. The spring 136 is stiffer than spring 137, hence requires more force to compress by a given distance. That is to say, spring 136 has a greater spring rate than that of spring 137. It is seen that both springs exert a bias for urging the cam member and dog to remain in the locked, or safety, position shown in FIG. 15. The cam member cannot slide further rearward than the position illustrated in FIG. 15 for the reason that the inner wall at the rear end of the bolt is staked radially inwardly at 138 over the conical end 139 of the cam member after the assembly of the cam member, the dog, the contactor and the springs has been completed within the bolt.

For the purpose of holding the locking dog 131 in the retracted position shown in FIG. 16 so that the bolt may be inserted through the hole, the rear end of the cam member is provided with a countersink 140 at the axis 117. Also, the rear end of the bolt is provided with an annular counterbore 141 concentric with the axis 117 which leaves an annular ring 142 which becomes staked over at 138 upon completion of the assembly within the bolt. The outer annular part 143 formed by this counterbore is provided with internal threads 144 adapted to receive outer threads 145 of a plug 146 shown in FIG.

16. At the forward end of this plug there is formed a pilot member 147 provided with a cone nose 148 adapted to fit into the countersink 140. The threads 145 of the plug are formed on an outer annular part 149 thereof which is shaped to fit into the counterbore 141 of the bolt.

When the plug is threaded to the bolt the conical nose 148 fits into the countersink 140 so that continued turning of the plug advances it causing the cone nose to push the cam member forwardly against the force of the springs 136 and 137 to the position shown in FIG. 16 where the dog 131 is completely retracted within the bolt. In this retracted or unlocked position the bolt can readily be inserted through the hole after which the nut 122 can be applied to the bolt and torqued against the workpiece, whereupon the plug 146 may be backed off from the rear end of the bolt allowing the springs to push the cam member rearwardly to move the dog to the locking position shown in FIG. 15. In this locked position the part of the dog projecting laterally from the bolt is behind the workpiece as in the case of FIG. 11.

Furthermore, means is provided to enable the dog to lock the nut in this locked position. For this purpose the nut is constructed with an outer annular structure 150 which extends forwardly from its hub portion 151 which contains the nut threads. The internal surface 152 of the annular portion 150 contains a number of lugs 153 which project radially inwardly toward the central axis 117, these lugs being spaced angularly apart so that spaces between adjacent projecting lugs can accommodate the part of the dog which projects radially outward from the bolt in the locking position, as best seen in FIG. 17. The entry of the dog into a space between a pair of adjacent lugs 153 serves to prevent the nut from turning on the bolt. Hence the nut cannot be removed from the bolt until the cam member is moved to the unlocked position shown in FIG. 15, ordinarily by use of the pilot plug 146.

The fastener of FIGS. 15 and 16 has advantages over the fasteners previously described herein. An important advantage resides in the presence of the two biasing springs 136 and 137 of different spring rates. These two different spring rates prevent the setting up of harmonic vibration while in use, which if present might unintentionally relieve the bias pressure on the cam member, thereby unlocking the fastener. Another important advantage of the presence of two springs resides in the provision of redundancy in case of the failure of one of the springs. Such redundancy increases the reliability and safety level of the assembly. A further important advantage resides in the provision of the plug 146 by which the locking dog can be held in its retracted position for insertion of the bolt through the hole. Still another advantage resides in the internal spaced lugs 153 on the nut by which the locking dog not only locks behind the work bodies but also locks the nut.

FIG. 18 shows nut 122 modified to have a plurality of adjacent axial serrations 175 (or teeth) instead of a lesser number of recesses and lugs. These serrations are, of course, a complete equivalent to the recesses and lugs 153 in FIG. 17. There are, however, more of them, and they are closer together. Dog 131 has a plurality of adjacent axial serrations 176, rather than a single-ended construction, so its serrations enter more than one of the serrations on the nut. Thus, a finer angular adjustment of the nut can be made. This embodiment of FIG. 18 is characterized by the dog's having a plurality of engaging structures, rather than only one, which as a group simultaneously engage more than one of the serrations in the nut. Of course, constructions different from serrations can be used instead, so long as a projection on the nut or dog enters a recess on the dog or nut to prevent rotation of the nut. The term "serration" is used in its broadest sense to include any type of adjacent recesses and projections.

This invention thereby provides a reliable safety bolt whose locking feature (the dog) is always known to be in its safetied position or not as a function of a visual examination of the position of a cam member which is directly coupled thereto in push-pull relationship. The angle of the cam surfaces to the axis 13 (or 83) is preferably selected so the cams positively drive the dog, but the dog cannot retract the cam member. This means that the cam surfaces are "locking" a respects forces exerted along the axis of the dog by the dog, but that forces on axis 13 will move the dog. This is in part a function of the coefficient of friction between the cam surfaces.

This invention is not to be limited by the embodiments shown in the drawing and described in the description, which are given by way of example and not of limitation but only in accordance with the scope of the appended claims.

I claim:

1. A safety bolt comprising: an element having a shank with an axis, the element having a first end and a second end, an axial passage opening onto one of said ends, and a laterally-extending passage in the shank and intersecting the axial passage; a dog in said laterally-extending passage slidably movable between an extending and a retracted position, whereby the dog extends beyond the maximum diameter of the shank in the extended position and retracts entirely within said shank in the retracted position, thereby being adapted to abut the back side of a workpiece into which the shank is inserted; a cam member axially movable in said axial passage and reactive with said dog to retract or to extend the same, said cam member having a pair of sloping cam surfaces which face in opposite lateral directions; a pair of oppositely facing spaced-apart follower surfaces on said dog, each said follower surface being parallel to and engaging a respective one of said cam surfaces in substantial surface-to-surface contact, whereby one set of said cam surfaces and follower surfaces causes movement of the dog in one direction of movement of the cam member and the other set causes movement of the dog in the other direction of movement of the cam member, said sets being in embracing relationship, whereby the lateral position of the dog is a unique function of the axial location of the cam member in the axial passage; and bias means biasing the cam member in its direction which forces the dog toward its extended position, the dog when extended when the shank is fully inserted in the workpiece preventing the removal of the bolt from the workpiece.

2. A safety bolt according to claim 1 in which the shank and the cam member have a hole to receive a cotter pin when the dog is in its extended position, 3. A safety bolt according to claim 1 in which the cam member has a tongue with a bearing surface which bears against a bearing surface on the dog to restrain the dog against rotation.

4. A safety bolt according to claim 3 in which the cam member includes a pair of said tongues, said tongues embracing said dog.

5. A safety bolt according to claim 1 in which a portion of the cam is non-circular, so as to prevent rotation of said cam.

6. A safety bolt according to claim 1 in which the angle of the cam surfaces and the follower surfaces to the axis is such as to permit cam actuation by axial force exerted on the cam member, but to lock against movement by forces exerted endwise on the dog.

7. A safety bolt according to claim 1 in which the passage adjacent to said one end includes a tapered shoulder which makes a seal with the cam member when the cam member bears against it.

8. A safety bolt according to claim 1 in which a portion of the cam member projects axially beyond the element when the dog is in its extended position.

9. A safety bolt according to claim 3 in which the angle of the cam surfaces and the follower surfaces relative to the axis is such as to permit cam actuation by axial force exerted on the cam member, but to lock against movement by forces exerted endwise on the dog.

10. A safety bolt according to claim 7 in which the angle of the cam surfaces and the follower surfaces relative to the axis is such as to permit cam actuation by axial force exerted on the cam member, but to lock against movement by forces exerted endwise on the dog.

11. A safety bolt according to claim 6 in which a portion of the cam member projects axially beyond the element when the dog is in its extended position.

12. A safety bolt according to claim 11 in which the passage adjacent to said one end includes a tapered shoulder which makes a seal with the cam member when the cam member bears against it.

13. A safety bolt according to claim 1 and a nut threaded to said bolt for abutting said workpiece, said nut having angularly spaced lugs, a space between which is entered by said dog when in the extended position of the dog, thereby locking the nut.

14. A safety bolt according to claim 1 and a nut threaded to said bolt for abutting said workpiece, said nut having angularly spaced apart serrations therein, and said dog having a plurality of adjacent angularly spaced apart serrations therein, whereby when the dog is in its extended position, its said serrations enter a plurality of serrations on the nut.

* * * * *